March 29, 1966  J. J. ROARK ETAL  3,243,695
METHOD OF FORMATION LOGGING AND CORE ORIENTATION BY
MEASURING THE PIEZO-ELECTRIC POTENTIAL PRODUCED
IN RESPONSE TO AN ELASTIC PULSE INTRODUCED
INTO A FORMATION AND CORE
Filed Dec. 21, 1962  7 Sheets-Sheet 1

Robert T. Schweisberger &
James J. Roark  INVENTORS.

BY John D. Gassett
ATTORNEY

Robert T. Schweisberger &
James J. Roark INVENTORS

BY John D. Gassett
ATTORNEY

United States Patent Office 3,243,695
Patented Mar. 29, 1966

3,243,695
METHOD OF FORMATION LOGGING AND CORE ORIENTATION BY MEASURING THE PIEZO-ELECTRIC POTENTIAL PRODUCED IN RESPONSE TO AN ELASTIC PULSE INTRODUCED INTO A FORMATION AND CORE
James J. Roark and Robert T. Schweisberger, Tulsa, Okla., assignors, by mesne assignments, to Esso Production Research Company, Houston, Tex., a corporation of Delaware
Filed Dec. 21, 1962, Ser. No. 246,395
9 Claims. (Cl. 324—13)

This invention is directed to a system for logging boreholes which penetrate subterranean formations. It is also related to a system for determining the orientation of a core cut from a subterranean formation.

In drilling a borehole into the earth, as for example in the search for hydrocarbons, it is a frequent practice to "core drill." The primary purpose of core drilling is to obtain relatively large chunks of the formation intact. A typical core cut for observation is, for example, two to three inches in diameter and from six inches to several feet long. When the core is brought to the surface, quite frequently it is desired to know how the core was oriented, i.e. the exact position of the core when it was in the formation before it was cut. There are certain ways of marking the core before it is cut so that it will be known how it was oriented. However, quite frequently due to the expense of using marking equipment or its inability or failure to properly mark the core, many cores have been cut, and are being cut, for which their true orientation is not known.

One object of the present invention is to describe a system whereby in a preferred system, a piezo-electric axis of orientation is obtained for the core and also for the borehole wall of the formation from which the core was cut. In a preferred system repeating elastic pulses are introduced into one end of the core as for example by means of an electro-acoustic transducer. Part way down the core, diametrically opposed measuring electrodes are applied to the core. The output potential is recorded and measured. The measuring electrodes are rotated part way around the core and the output potential from the measuring electrodes is again measured and recorded. This is repeated as often as necessary to determine the positions of minimum potential and positive and negative maximum potentials which positions are marked on the core. Diametrically opposed measuring electrodes are applied in the borehole to the walls of the formation from which the core was cut. A repetitive elastic pulse is introduced into the formation adjacent the borehole and the output potential from a pair of measuring electrodes is observed. The measuring electrodes are partly rotated about the borehole wall and oher elastic pulses introduced into the formation adjacent the borehole wall. This is repeated until positions of minimum potential and positive and negative maximum potentials are obtained. Means are provided to indicate the true direction at which these outputs are obtained. The simple correlation of the piezo-electric axes of the core and the borehole wall such that the minima and the positive and negative maxima of the core coincide with the corresponding positions measured for the borehole wall will quickly and correctly orient the core.

Various other objects and a better understanding can be had from the following description taken in conjunction with the drawings in which.

In certain rocks containing crystals that are subject to mechanical stresses, an electric potential is obtained. Direct piezo-electric effect can be defined as electric polarization produced by mechanical strain in crystals belonging to certain classes, the polarization being proportional to the strain and changing sign with it. Many rocks that occur widely within the earth contain quartz and other piezo-electrics and have oriented textures. Examples of such rocks are granites, gneisses, sandstones. It is thought that theoretically most rocks do contain a certain piezo-electric texture.

Figure 1:
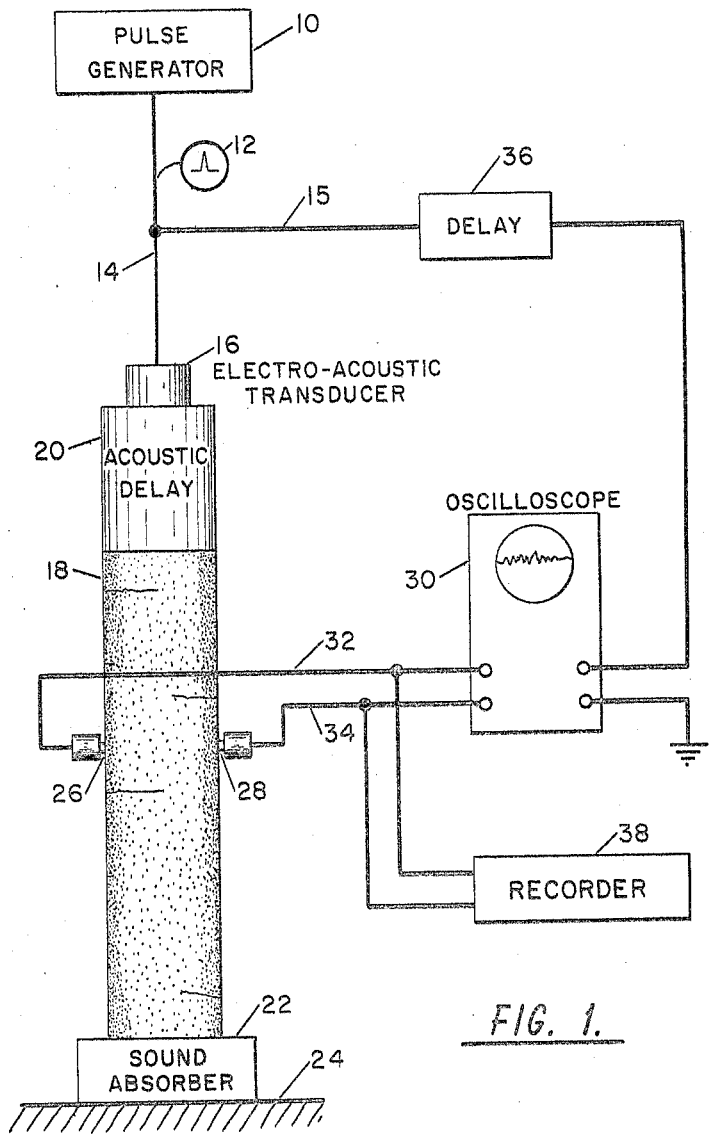
FIG. 1 illustrates in schematic form a system for determining the piezo-electric effect of a core sample.

FIG. 1 shows a system for determining the presence of the piezo-electric effect of a core sample and, if present, the orientation of this effect. Illustrated thereon is a pulse generator 10 which is capable of generating a sharp spike 12 which, for example, has a duration of less than about 10 microseconds and has an amplitude of about 500 volts. The pulse 12 is fed through conductor 14 to an electro-acoustic transducer 16. The electro-acoustic transducer 16, if of the piezo-electric type, can be a quartz crystal, Rochelle Salt crystal or barium titanate for instance.

A core sample 18 from which the piezo-electric properties are to be determined is placed between an acoustic delay 20 and a sound absorber 22 which is placed upon a firm object 24 such as the earth. Acoustic delay 20 can be aluminum or brass for instance. The acoustical delay provides for sharper first arrivals of electrical wavelet and aids in avoiding disturbances from transducer 16. The core sample 18 is a core cut from a subterranean formation. If the core is longer than about four inches, then the acoustic delay section may be omitted. Sound absorber 22 can be, for example, felt or foam rubber.

Figure 5:
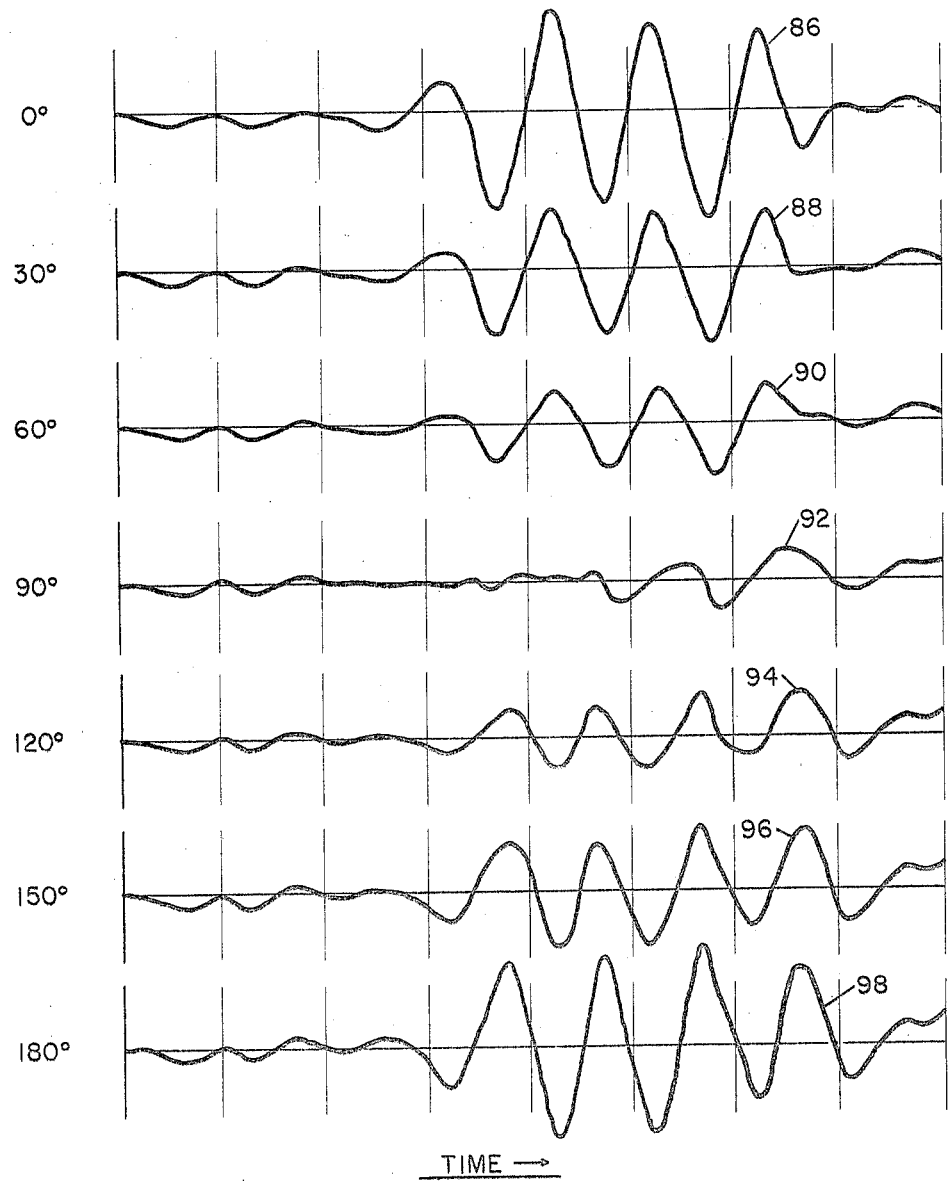
FIG. 5 illustrates typical waveforms representing output potentials from different electrode pair positions about a core.

Spaced diametrically opposite each other about the circumference of core 18 is a first movable electrode 26 and a second elctrode 28. The electrodes 26 and 28 are electrically connected to a cathode ray oscilloscope 30 through leads 32 and 34 respectively. The output from pulse generator 10 is also connected through conductor 15 to a delay 36 which delay may be incorporated in the oscilloscope circuitry. The delay should preferably be of the order of about five microseconds per inch distance between transducer 16 and the electrodes 26 and 28. The output of delay 36 is a pulse which is connected to oscilloscope 30 to trigger the horizontal sweep. The potential across electrodes 26 and 28 is also fed to a recorder such as oscillograph 38. Electrodes 26 and 28, while being maintained 180° apart, are rotated by steps 360° around core sample 18. At each step the pulse generator actuates transducer 16 and the potential across electrodes 26 and 28 is observed or recorded on oscilloscope 30 and oscillograph 38. Illustrations of waveforms representing the various measured potentials are shown in FIG. 5 and will be discussed hereinafter.

Figure 2:
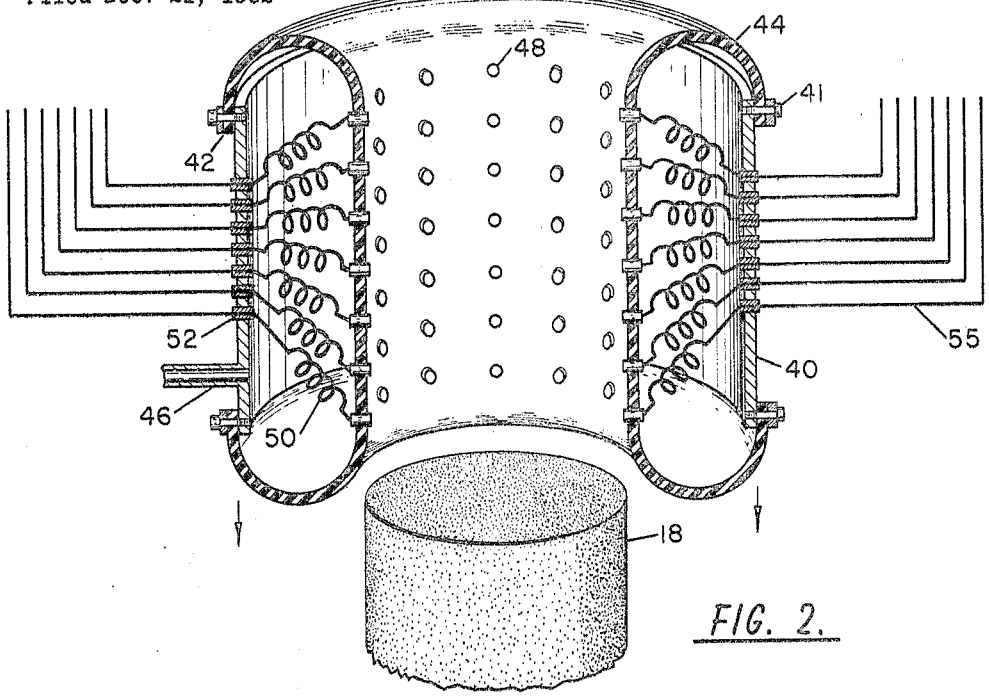
FIG. 2 illustrates a preferred embodiment for measuring output potentials from various opposed points on the external surface of the bore.
Figure 4:
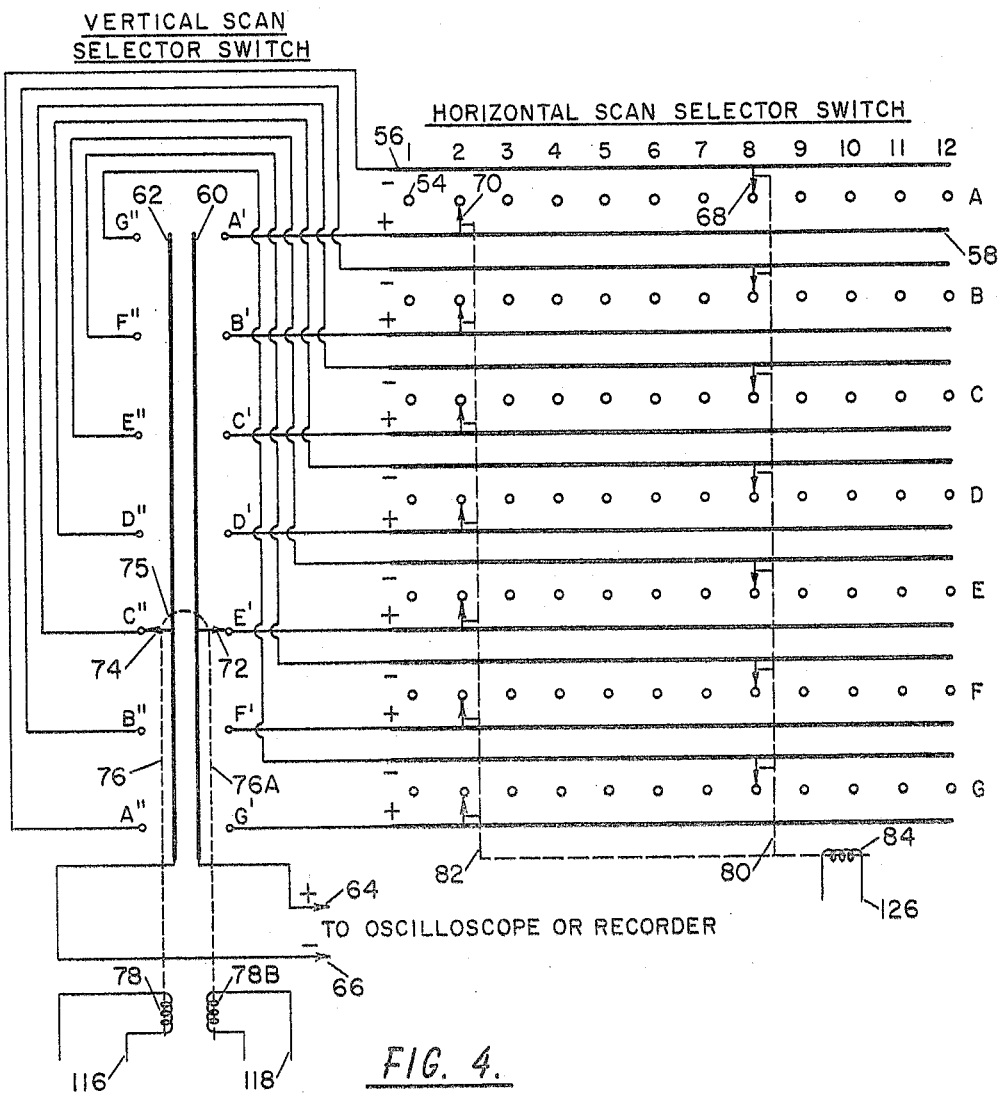
FIG. 4 illustrates an electrode selector switch system for obtaining output potentials from selected electrodes for the electrode arrangement of FIG. 3.

Turning now to FIG. 2, there is illustrated a preferred manner of placing electrodes about a core. A selector switch arrangement for this is illustrated in FIG. 4 and will be described more in detail hereinafter. Shown in FIG. 2 is a cylindrical frame 40 which is preferably made of metal. Molded to metal cylinder 40 and secured there by bolts 42 is an inflatable expandable sleeve 44 which is preferably rubber. Conduit means 46 is provided in the wall of cylinder 40 for inflating and deflating sleeve 44. Mounted in sleeve 44, as by molding, are a plurality of spaced electrodes 48. Each electrode 48 has leads 50 to an electrode terminal 52 in the wall of cylinder 40. In operation, the rubber sleeve assembly 40 is mounted about the core sample 18 and when in the proper longitudinal position with respect to core, the sleeve is inflated. This forces electrodes 48 into firm contact with the core.

Figure 3:
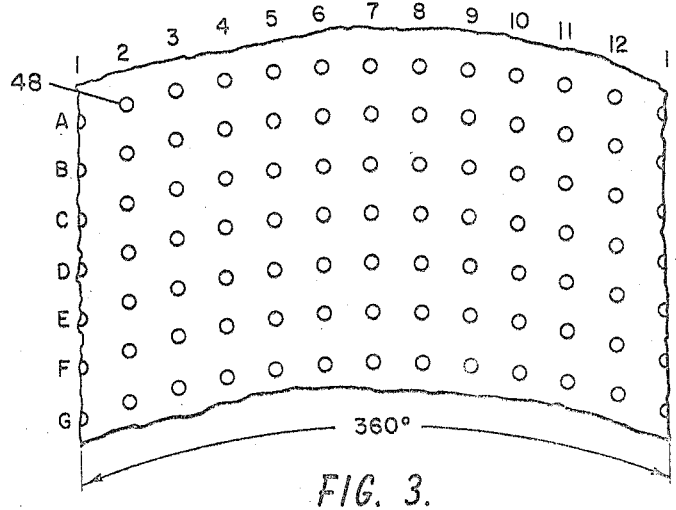
FIG. 3 illustrates an unfolded plan of an electrode arrangement of the apparatus of FIG. 2.

FIG. 3 illustrates an unfolded plan of electrode arrangement of the apparatus of FIG. 2. It will be noted that there are twelve columns representing electrodes 30° apart around the circumference of the interior of the sleeve 44. There are shown seven horizontal rows illustrated as A, B, C, D, E, F and G. It is thus seen that this arrangement gives a wide selection of electrode positions about the core sample 18. Other arrangements, if desired, can be selected. Each electrode illustrated in FIG. 3 is connected to an external electrode lead terminal 52 by an independent conductor 50. Leads 32 and 34 of FIG. 1 are connected to a selected pair of terminals 48 across which it is desired to measure the potential. Various switching arrangements can be provided for this. One such means is illustrated in FIG. 4. Illustrated thereon are a vertical scan selector switch portion and a horizontal scan selector switch portion. Illustrated thereon are terminals 54 for each electrode 48 illustrated in FIGS. 2 and 3 which are molded in rubber sleeve 44. Terminals 54 are connected to external lead terminals 52 by individual conductors 55. There are seven horizontal rows of such terminals and a negative bus bar 56 and a positive bus bar 58 for each such row. One horizontal row of terminals 54 and one negative bus bar and one positive bus bar can be called a deck. Thus, there are decks A, B, C, D, E, F and G.

In the vertical scan selector switch portion of the selector switches of FIG. 4, there are illustrated positive bus bar 60 and negative bus bar 62 which has external leads 64 and 66 respectively which go to oscilloscope 30 or recorder 38 or both.

Each deck has two sliding switches, for example deck A has a sliding contact switch 68 which selectively provides contact between an electrode terminal in deck A and the negative bus bar 56. Deck A also has a second sliding switch 70 which provides selection of contact between an electrode terminal of the deck with the positive bus bar 58. As is obvious from looking at the drawing, each deck B, C, D, E, F and G likewise has similar switches as switches 68 and 70 of Deck A.

In the vertical scan selector switch there are terminals A′, B′, C′, D′, E′, F′ and G′ which are positive terminals for the positive bus bars of decks A, B, C, D, E, F and G respectively. Also in the vertical scan selector switch portion adjacent the negative bus bar 62 are terminals A″, B″, C″, D″, E″, F″ and G″. There is indicated a sliding contact switch 72 between positive bus bar 64 to selectively contact terminals A′, B′, C′, D′, E′, F′ and G′. Also illustrated is sliding switch 74 to establish contact between negative bus bar 66 and negative terminals A″, B″, C″, D″, E″, F″ and G″. It is thus quite clear that by proper selection or positioning of selector switches 72 and 74 that any deck A, B, C, D, E, F or G can be selected, or if desired the negative bus bar of one deck and the positive bus bar of another deck can be selected by switches 72 and 74. The particular electrode terminal 54 is selected by proper positioning of the switch 68 and 70 of the selected deck or decks to obtain contact with the electrode at the desired circumferential position. As an example for the switches in the positions shown, electrode terminal under horizontal position column 2 and in deck E is connected to the positive terminal and the electrode terminal under column 8 in deck C is connected to the negative terminal. Thus, the difference in potential between the two corresponding electrode terminals is obtained when the electro-acoustic transducer 16 is energized. To briefly summarize, the vertical position of switches 72 and 74 determine the positive and negative bus bar respectively which are contacted. This determines which decks are contacted. The particular electrodes are selected from such decks. The electrode in such decks are determined by the position of switches 68 and 70 of the decks involved.

The sliding switches of electrode selector switches in FIG. 4 can be operated by hand. However, for remote control it is convenient to provide means whereby the switches can be moved as for example by stepped switches. This is indicated in FIG. 4 by dotted line 76 connecting switch 74 to the armature 78 of a stepping switch. Switch 72 is connected as indicated by dotted line 76A to the armature 78B of another independently operated stepping switch. If switches 72 and 74 are to be operated together, they can be ganged as indicated by line 75. In a preferred arrangement, the decks A, B, C, D, E, F and G are circular so that column 1 follows column 2. Normally, it will be desired that the electrodes selected be diametrically opposed. Therefore, the switch in each deck which contacts the negative bus bar will be 180° or, for the switch shown, six electrode terminals from the sliding switch which contacts the positive bus bar. Thus, all the sliding switches in the various decks which contact the positive bus bar can conveniently be ganged together as illustrated by dotted line 82. Likewise, all the switches which contact the negative bus bars of the decks can be ganged together as illustrated by line 80 for negative bus bars. All the sliding switches under the horizontal scan selector switch section are thus gang connected to the armature 84 of a step switch which advances the sliding switches one position or to the next electrode terminal, which for the example given is 30° apart.

Attention is now directed especially to FIG. 5 and FIG. 1. The application of a pulse to electro-acoustic transducer 16 results in an elastic pulse being applied to the upper end of core sample 18. The application of an elastic pulse to one end of the core results in a measurable voltage difference across the core between electrodes 26 and 28. This potential is measured and recorded as indicated at waveform 86 in FIG. 5. Measuring electrodes 26 and 28 are rotated 30° and an elastic pulse similar to that used to obtain waveform 86 is again applied to the core. It is found then that the measurable voltage transient is slightly different. This is illustrated in waveform 88. This procedure is repeated for the electrodes rotated 60° and the waveform is illustrated as waveform 90. The electrodes are moved to different positions around the core and similar elastic pulses are applied at each position. In FIG. 5 the waveform obtained at 90° is indicated as waveform 92; that at 120° is illustrated as waveform 94; that at 150° is illustrated as 96; and at 180° as waveform 98. An examination of these waveforms shows that the maximum was obtained at 86 and at waveform 98 and that the minimum was obtained by waveform 92. It is further seen that the voltage potential across electrodes in waveform 86 has one polarity and that in 98 has the opposite polarity. The waveform in one polarity is decreased from 86 to 92 where the minimum is obtained and then it increases in the opposite direction till the maximum of the opposite polarity is obtained at waveform 98. The positions of the electrodes 26 and 28 when the minimum output is indicated at waveform 92 and the position of the positive and negative maxima is indicated by waveforms 86 and 98 are indicated on the core. Similar waveforms are observed as the electrode pair is rotated the remaining 180°.

Figure 6:
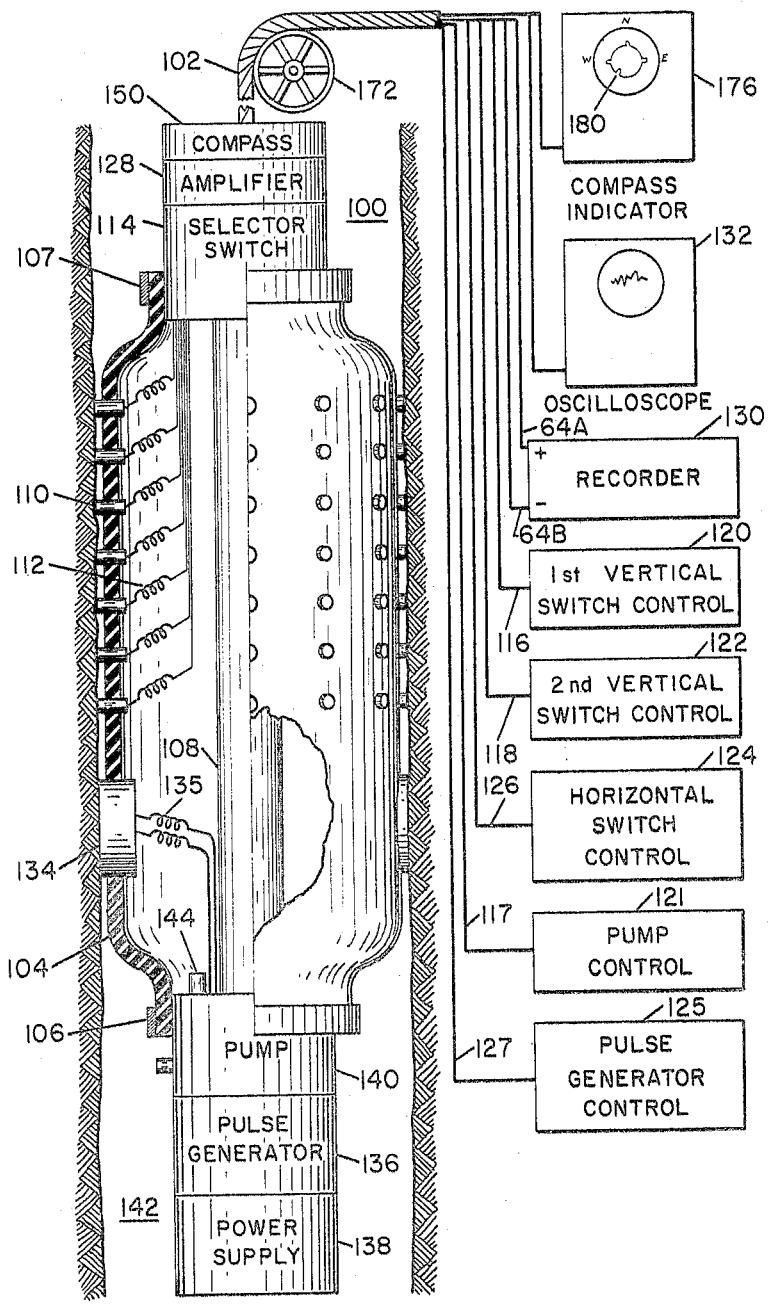
FIG. 6 illustrates an apparatus for determining the piezo-electric effect of a formation which had been penetrated by a borehole.

To properly orient the core with the formation from which it was cut, that is to know what part of the core was to the North, etc.; a log similar to that obtained from the core and illustrated in FIG. 5 is obtained for the borehole wall of the formation from which the core was removed. Means for obtaining these downhole waveforms are illustrated (a) in FIG. 6 which shows a borehole sonde and (b) in FIG. 7 which shows another borehole sonde with alternate sound source. Illustrated in FIG. 6 is a borehole 100 in which a multi-conductor logging cable 102 is suspended. Supported at the lower end of the multi-conductor logging cable 102 is a borehole sonde. The borehole sonde includes an inflatable sleeve 104. Inflatable sleeve 104 is supported from a frame means which includes upper annular member 107, lower annular member 106, housing for pump 140, housing for selector switch 114 and tubing 108. Protruding through the wall of inflatable sleeve 104 is a plurality of external electrodes 110 which has a similar arrangement to that of the electrode arrangement of FIG. 3 except that these electrodes are external. Of course other arrangements could be had if desired. Leads 112 from each external electrode 110 is passed to selector switch 114. Selector switch 114 is preferably rigid with respect to annular member 107. Electrode leads 112 pass through the bottom of the housing of switch 114 in a sealed relationship.

Selector switch 114, in a preferred embodiment, is similar to the electrode selector switch which is illustrated in FIG. 4. The leads to solenoids 78, 78B, and 84 are passed through conductors 116, 118 and 126 respectively to the surface to a first vertical switch control 120, a second vertical switch control 122 and a horizontal switch control 124 respectively. Thus by sending a pulse from control 120 down conductor 116, sliding contact switch 74 can be advanced a step to another position and by sending a pulse sent from control 122 down conductor 118, switch 72 can be advanced a step to another position. Likewise, by sending pulses from control 124 through conductor 126, the ganged horizontal scan selector switches can be advanced in a stepwise position to any desired electrode. The voltage potential between the positive terminal 64 and the negative terminal 66 is connected to amplifier 128 by conductors 64 and 66. The amplified voltage potential is conducted upwardly through conductors 64A and 66A to the surface where it is recorded by recorder 130 and displayed on oscilloscope 132.

Also protruding from the inflatable sleeve 104 are a ring of electro-acoustic transducers 134 which can be of similar material to that of electro-acoustic transducer 16. A pulse generator 136 is mounted at the lower end of packer 104 and is used to excite the transducers 134 through conductors 135. Pulse generator 136 can be similar to pulse generator 10. A downhole power supply 138 is provided for supplying power to pulse generator 136.

Also mounted at the lower end of inflatable sleeve 104 is a reversible pump 140. Pump 140 is reversible so that it can pump fluid from reservoir 142 through conduit 144 to inflate sleeve 104 or it can pump fluid from conduit 144 to reservoir 142 to deflate sleeve 104. The pump can be actuated from the surface through electrical conductor 117 from pump control 121. When pump 140 is operated, it pumps fluid into packer 104 and inflates it. This forces the electrodes 104 against the borehole wall and also the electrical acoustical transducer 134 against the borehole wall. The tool is then ready to be operated. The electrode selector switches in FIG. 4 and indicated as selector switch 114 in FIG. 6 is adjusted from the surface, controls 120, 122, and 124 which have suitable position indicating means, to connect the desired electrodes across the electrode terminals 64 and 66. Thus the difference in potential between the two selected points of the borehole wall can be obtained upon the excitation of transducers 134. These transducers are excited by pulse generator 136 which is actuated from the surface by pulse generating control 125 through conductor 127. The switches of FIG. 4 are actuated to select the electrodes across which the potential is measured as desired and for each such desired setting the pulse generator is actuated and the potential recorded. This is repeated until a desired family of curves such as that illustrated in FIG. 5, for example, is obtained for the downhole selected position of the borehole sonde. It should be noted that especially good contact of the electrodes 110 with the borehole wall is not essential. In order that the family of waveforms obtained from the apparatus of FIG. 6 can be compared with that obtained from the core at the surface, it is necessary to know the orientation of the sonde when it is downhole. This is easily accomplished by use of a compass 150 which is attached to the frame of the downhole tool. The position of an identifying mark on the downhole tool is indicated at 180 with respect to North on a surface recorder 176. The compass can for example be similar to that described in U.S. Patent 2,609,513.

Figure 7:
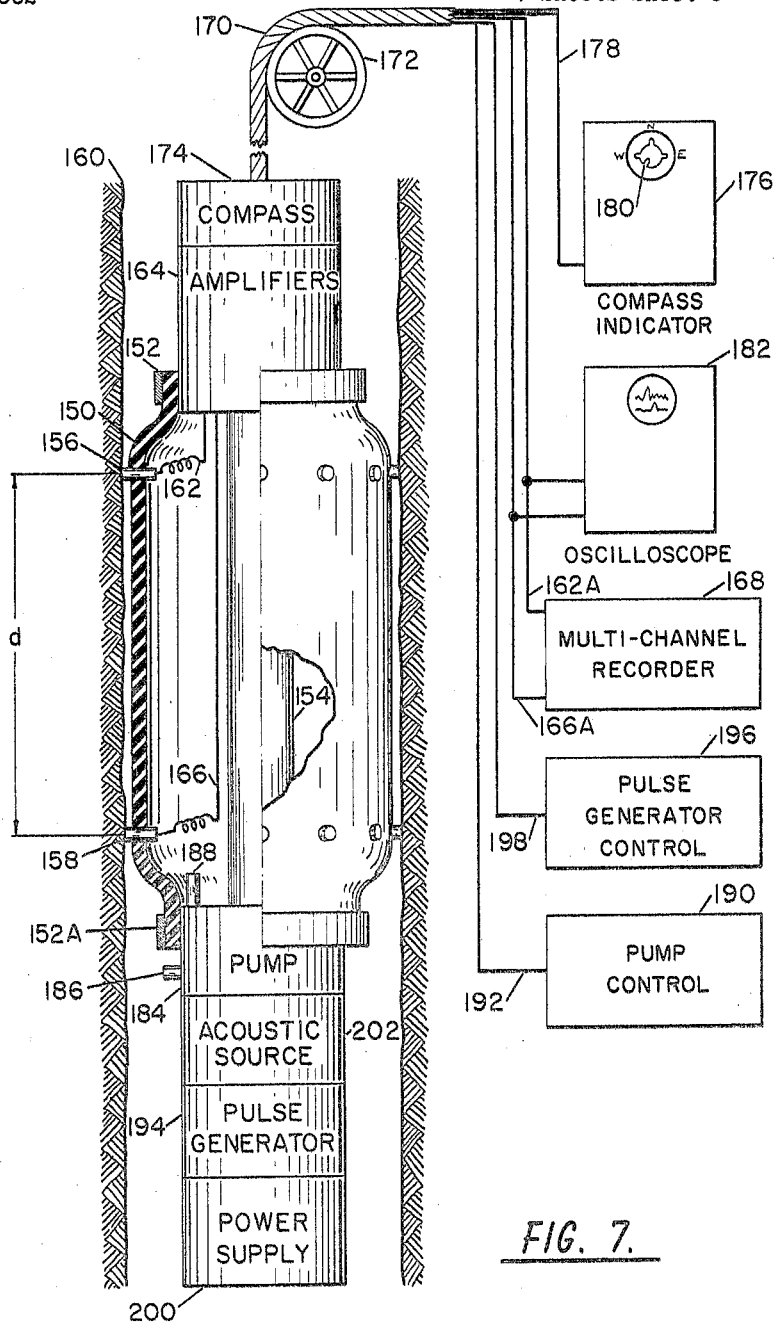
FIG. 7 illustrates a logging tool having a single elastic wave source.

Reference is now made to FIG. 7 which illustrates an alternate downhole logging apparatus. Illustrated thereon is an inflatable sleeve 150 supported from annular frames 152 and 152A which are supported from tubular member 154 similarly as sleeve 104. Mounted in the walls of sleeve 150 is an upper row of electrodes 156 and a lower row of electrodes 158. As shown there indicated to be 12 electrodes equally spaced about the periphery about the sleeve 150. These electrodes are mounted in the wall of sleeve 150 such as by molding and protrude through either side, the external side being in contact with the borehole 160 when the sleeve is inflated. Each electrode 156 has an internal lead 162. These leads 162 are connected, as diametrically opposed pairs to individual amplifiers in amplifier unit 164. Likewise the electrodes 158 have their internal terminal connected through conductors 166, as pairs, to individual amplifiers in amplifier unit 164. The amplifiers can be conventional amplifiers whose gain is either fixed or known. Conductor lines 162a and 166a lead to multichannel recorder 168 and represent the voltage outputs from the individual amplifiers of unit 164. Multiple-channel recorder 168 simultaneously records the potential across each diametrically-opposite pairs of electrodes. Thus there are six waveforms recorded for the lower group of electrodes 158 and six waveforms for the upper group of electrodes 156, for the assumed number of electrodes. The individual conductors 166A and 162A are contained in a multichannel cable 170 which is supported as the surface about a pulley 172. Pulley 172 is preferably of the type to indicate or record the depth of the logging tool.

Fixed with relation to member 152 is compass 174 which serves to give the orientation of the position of the apparatus in the borehole. The compass has a surface indicator 176 which is connected by conductor 178 to the compass. Compass indicator 176 indicates the location of a mark 180 on the apparatus with respect to magnetic North.

A dual trace oscilloscope 182 is selectively connected to lead lines 162A and 166A to give a visual monitor of the signal being recorded on recorder 168.

At the lower end 152a, of sleeve 150, is a pump 184 which has a sealing relationship with sleeve 150 and tubular member 154. The pump has inlet conduit 186 and discharge conduit 188 for pumping fluid from the annulus into the sleeve 150 so as to inflate it, thus forcing the electrodes outwardly toward the borehole wall. Pump 184, similarly as pump 140 of FIG. 6, is a reversible pump so that fluid can be pumped in the reverse direction to deflate the sleeve. Pump control 190 is provided at the surface. The pump control has conductor 192 leading to the pump.

Figure 8:
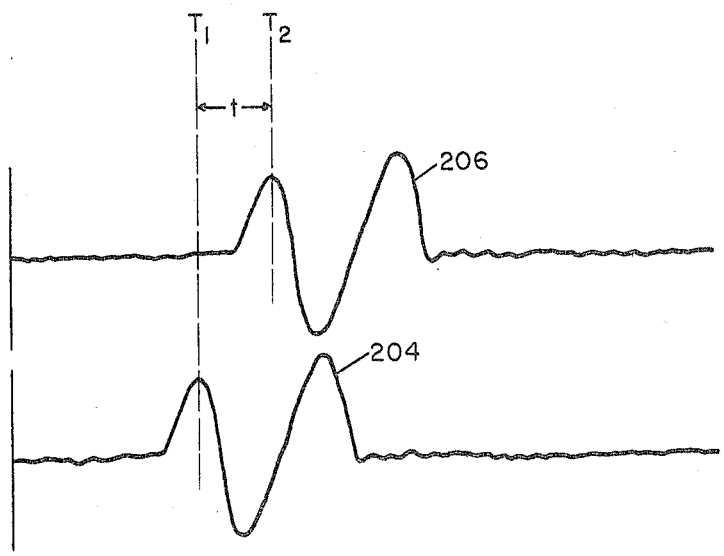
FIG. 8 illustrates waveforms obtained from the apparatus of FIG. 7 which are useful in obtaining velocity information.

Located beneath the pump is a pulse generator 194 which can be a generator similar to generator 10 in FIG. 1. This pulse generator can be controlled from the surface by pulse generator control means 196 having a lead 198 going to pulse generator 194. Pulse generator control 196 can be a source of direct current which actuates pulse generator 194 through a relay device or it can supply initiating pulses. Pulse generator 194 can obtain its power from power supply 200. The pulse generator 194 has its output connected to an acoustical source 202 which is similar to acoustical source 134 except that the acoustical source in FIG. 7 is located within the approximate center of the borehole. In operation, the device in FIG. 7, pulse generator 194 is actuated thus causing acoustic source 202 to impart an elastic wave into the borehole fluid and thus into the formation surrounding the borehole 160. This elastic wave travel more or less in a spherical pattern out from source 202. As the wave passes the lower row of electrodes, there will be differences of potential across the various electrodes. As the elastic wave passes the lower row of electrodes 158, the differences in potential for each of the plurality of pairs of diametrically opposed electrodes 158 are recorded on multi-channel 168. The difference in potential measured across one pair of electrodes of the lower row 158 is illustrated in FIG. 8 as waveform 204. As the elastic wave passes the upper row of electrodes 156, the differences in potential for each of the plurality of pairs of diametrically opposed electrodes in the upper row are recorded on multi-channel recorder 168. A typical waveform which is illustrated as waveform 206 in FIG. 8. The waveforms of the electrodes 158 are a family of curves or waveforms similar to the waveforms represented in FIG. 5. There are similar nulls and maxima in both polarities. There is a similar family of curves for the upper row of electrodes 156. This information can be used similarly as the information obtained from the tool of FIG. 6.

The apparatus of FIG. 7 is also capable of use as a velocity logger, that is it can be used for determining the rate at which an elastic wave passes through the formation. This is illustrated in FIG. 8 for example. The waveform 204, which is the voltage or difference in potential between a pair of diametrically opposed electrodes 158 of the lower row of electrodes, occurs or appears at time $T_1$. This shows the arrival of the elastic pulse at the formation adjacent electrodes 158. At a later time $T_2$, the piezoelectric effect is detected at the upper row of electrodes 156. This signifies the arrival of the elastic wave at the level of the formation adjacent electrodes 156. Thus the period of time $t$, which is $T_2-T_1$, the time required for the elastic waves to travel the distance D between the two rows of electrodes, is easily determined. To determine the velocity of the elastic wave in the formation all that is necessary to do is to divide the distance D by the time T.

The device of FIG. 6 is also quite useful for determining the angle of dip, i.e. the spatial relationship of the oriented crystals of crystalline texture as well as the direction of their longitudinal axis. This information is quite helpful to geologists in making studies of the underground formation, etc. A very good way of obtaining the angle of dip is to first set the selector switch 114 so that only one deck, such as for example deck D, in FIG. 4 is used. The difference in potential is then obtained for each of the diametrically opposite pairs, that is between electrodes when the horizontal switches for deck D are in position 1 and 7, 2 and 8, 3 and 9, 4 and 10, 5 and 11, and 6 and 12. When it is determined which pair obtains the maximum potential difference, it is known that this is the general direction of orientation. By way of example it will be assumed that this maximum potential difference was obtained between electrodes under row 1 and 7. A vertical plane is then drawn through the points of contact representing contacts 1 and 7 in row D. The difference of potential is then obtained for diametrically opposite points in the plane thus defined but whose points are at different vertical angles with respect to the plane of deck D. (That is, scanning is in a vertical plane.) The maximum potential difference is thus measured in this vertical plane and indicates the two points which lie in the plane of dip of the deposited crystals. By knowing the positions of these two points, that is their horizontal attitude and their vertical attitude, the dip of the piezo-electric axis is determined. This procedure can be used in the borehole wall or the removed core or both.

Also in some instances, it may be desired to obtain the piezo-electric properties of the formation over a rather thick interval. This can be done in a step-wise progression such as by inflating the sleeve, exciting the acoustical transducer and measuring and recording the desired piezo-electric effects for that location. The sleeve is then deflated, moved to a second location, again inflated and the piezo-electric measurements again made. This can be repeated as often as necessary. Another way of obtaining the piezo-electric properties over a wide interval is by inflating the sleeve to where the electrodes make loose contact with the formation wall and then continuing moving the tool (such as shown in FIG. 7) vertically in the well bore throughout the interval being logged. In this system, pulse generator 194 is set to generate repeatedly a pulse such as for example 20 pulses per second. The logging tool is pulled through the well bore at a rate relatively slow compared to the movement of the elastic pulse through the formation. The speed at which the device is moved through the well bore should preferably not be in excess of about 1 to 10 feet per minute. The apparatus of FIG. 7 is especially useful for this purpose as the piezo-electric effect is measured at diametrically opposed points all around the borehole wall.

As shown above, the embodiments of this invention are also useful when there is no core. The device can be used as a downhole logger to obtain a family of curves such as illustrated in FIG. 5 which is indicative of the piezo-electric axis orientation of the formation. This, in turn, is usually related to the grain orientation of the formation.

While there are above disclosed but a limited number of embodiments of the systems of the invention herein presented, it is possible to produce still other embodiments and not depart from the inventive concept herein disclosed. It is therefore desired that only such limitations be imposed on the appended claims as are stated therein.

What is claimed is:

1. A method of orienting a core which has been cut from a formation traversed by a well bore which comprises:
   (a) introducing an elastic pulse to one end of the core;
   (b) measuring the piezo-electric potential produced responsive to said pulse from diametrically opposed points in a given plane along the wall of the core;
   (c) recording the potential thus measured;
   (d) repeating steps (a), (b) and (c) for different pairs of points in said plane around the circumference of the core;
   (e) applying an elastic pulse to the wall of the well bore from where the core was obtained;
   (f) measuring the piezo-electric potential at two diametrically opposed points along the wall of the well bore resulting from the input elastic pulse;
   (g) recording the potential measured in step (f);
   (h) repeating steps (e), (f) and (g) for different pairs of points around the circumference of the well bore;
   (i) and recording the various positions of the points at which the potentials are measured so that the core can be oriented in relation to the borehole;

(j) and correlating the recordations of steps (c), (d), (h), and (i) to orient the core in relation to the borehole.

2. A method of logging a formation traversed by a well bore which comprises:
   (a) sequentially producing elastic pulses at one level of the wall of the well bore and measuring the piezo-electric property of the formation traversed by the well bore at vertical points therealong;
   (b) and recording the piezo-electric properties thus measured.

3. A method of logging an underground formation traversed by a well bore which comprises: producing an elastic pulse at one level of the wall of the well bore; measuring the piezo-electric potential produced responsive to said pulse between two points on the well bore wall vertically spaced from said level.

4. A method of logging a formation traversed by a well bore which comprises: producing an elastic pulse at one level of the wall of the well bore and measuring the piezo-electric property of the formation between at least two horizontally-spaced points on the wall of the well bore; producing an elastic pulse at another level of the wall of the well bore and measuring the piezo-electric property of the formation between one of said two points and a third point on the wall of the well bore spaced vertically from said two points; and recording the piezo-electric properties thus measured.

5. A method of logging an underground formation traversed by a well bore which comprises: introducing an elastic pulse at one point into the wall of the well bore; measuring the piezo-electric potentials produced responsive to said pulse between individual pairs of a plurality of pairs of diametrically opposed points spaced vertically from said first point so that the two points having the greatest potential can be determined, said plurality of points being on essentially the same horizontal plane; introducing a second elastic pulse into the formation; measuring the piezo-electric potential produced responsive to said second pulse between two points of different vertical positions and lying essentially in a plane passing through the pair of points in which the greatest potential was obtained from the introduction of the first elastic pulse.

6. A method of logging a well bore which comprises: introducing an elastic pulse at one location in the wall of the well bore; measuring the piezo-electric response to said pulse of the formation traversed by the well bore at a first vertical location spaced from the location at which the elastic pulse was introduced; recording with respect to time the piezo-electric response thus measured at the first location; measuring the piezo-electric response to said pulse at a second location along the well bore spaced from said first location; recording with respect to time the piezo-electric response thus measured at the second location such that the time required for the elastic pulse to travel from said first vertical location to said second location can be determined so that the velocity of the elastic wave through the formation can be determined.

7. A method of logging a formation traversed by a well bore which comprises: applying an elastic pulse to the formation adjacent the borehole; measuring the piezo-electric potentials produced responsive to said pulse between each of a plurality of pairs of diametrically opposed points on the borehole wall; and recording the potentials thus measured.

8. A method of logging a formation traversed by a well bore which comprises: applying an elastic pulse to the formation traversed by the well bore; measuring the difference in piezo-electric potential produced by said pulse between a first pair of diametrically opposed points on the wall of the well bore; recording the potential thus measured; applying a second elastic pulse to the formation; measuring the difference in piezo-electric potential produced responsive to said second pulse between a different pair of points of the borehole wall; and recording the potential thus measured at the different points.

9. A method of determining the in situ orientation of a core which has been cut by a formation traversed by a well bore which comprises:
   elastic-pulsing the core with at least one elastic pulse and measuring piezo-electric potentials produced around the surface of the core responsive thereto to form a first potential profile;
   elastic-pulsing the portion of the formation from which the core was extracted and measuring the piezo-electric potentials produced thereby at a plurality of locations on the wall of the portion of the well bore formed by extraction of the core to form a second potential profile; and
   correlating the first and second potential profiles to obtain an in situ orientation of the core.

References Cited by the Examiner

UNITED STATES PATENTS

| | | | |
|---|---|---|---|
| 2,544,569 | 3/1951 | Silverman | 340—18 X |
| 2,849,075 | 8/1958 | Godbey | 340—18 X |
| 2,963,641 | 12/1960 | Nanz | 324—13 |
| 3,050,150 | 8/1962 | Tixier | 181—53 |
| 3,149,304 | 9/1964 | Summers | 340—18 |

WALTER L. CARLSON, *Primary Examiner.*

E. E. KUBASIEWICZ, *Assistant Examiner.*